United States Patent
Shivarudrappa et al.

(10) Patent No.: US 12,480,342 B2
(45) Date of Patent: Nov. 25, 2025

(54) AIRCRAFT LATCH ASSEMBLY WITH LOCK

(71) Applicant: Rohr, Inc., Chula Vista, CA (US)

(72) Inventors: Shashidhar Shivarudrappa, Bangalore (IN); Sangareddy Challamreddy, Bidar (IN)

(73) Assignee: Rohr, Inc., Chula Vista, CA (US)

( * ) Notice: Subject to any disclaimer, the term of this patent is extended or adjusted under 35 U.S.C. 154(b) by 7 days.

(21) Appl. No.: 18/388,656

(22) Filed: Nov. 10, 2023

(65) Prior Publication Data
US 2024/0159087 A1    May 16, 2024

(30) Foreign Application Priority Data
Nov. 10, 2022  (IN) .............................. 202211064346

(51) Int. Cl.
*E05C 3/08* (2006.01)
*B64D 29/06* (2006.01)

(52) U.S. Cl.
CPC ................ *E05C 3/08* (2013.01); *B64D 29/06* (2013.01)

(58) Field of Classification Search
CPC ......... B64D 29/06; B64D 29/08; F02K 1/766; F02K 1/80; E05C 3/08
See application file for complete search history.

(56) References Cited

U.S. PATENT DOCUMENTS

| | | | |
|---|---|---|---|
| 2,904,141 A * | 9/1959 | Henrichs | B64D 29/06 292/108 |
| 4,159,137 A | 6/1979 | Richter | |
| 5,073,075 A * | 12/1991 | Duran | F16B 5/10 411/378 |
| 6,606,889 B1 | 8/2003 | Tweedy | |
| 8,544,900 B2 | 10/2013 | Elbrecht | |
| 8,864,189 B2 | 10/2014 | Fournie | |
| 11,193,305 B2 | 12/2021 | Helsley | |
| 2016/0280383 A1* | 9/2016 | Lee | B64D 29/08 |
| 2017/0306669 A1 | 10/2017 | Helsley | |
| 2018/0223572 A1* | 8/2018 | Artin | E05C 17/08 |
| 2018/0320724 A1 | 11/2018 | Bowers | |

FOREIGN PATENT DOCUMENTS

BE            467209 A      2/1947

OTHER PUBLICATIONS

EP search report for EP23209234.6 dated Mar. 13, 2024.

* cited by examiner

*Primary Examiner* — Andrew H Nguyen
(74) *Attorney, Agent, or Firm* — Getz Balich LLC

(57) ABSTRACT

An aircraft assembly includes a keeper, a latch and a lock. The latch includes a handle and a hook structure operatively coupled to the handle. The hook structure is engaged with the keeper when the handle is in a closed position. The hook structure is disengaged from the keeper when the handle is in an open position. The lock includes a catch, a lever and a spring. The lever is configured to rotate about an axis between a locked position and an unlocked position. The lever is aligned with the catch locking the handle in the closed position when the lever is in the locked position. The lever is misaligned from the catch unlocking the handle from the closed position when the lever is in the unlocked position. The spring biases the lever axially along the axis in a direction towards the handle.

19 Claims, 13 Drawing Sheets

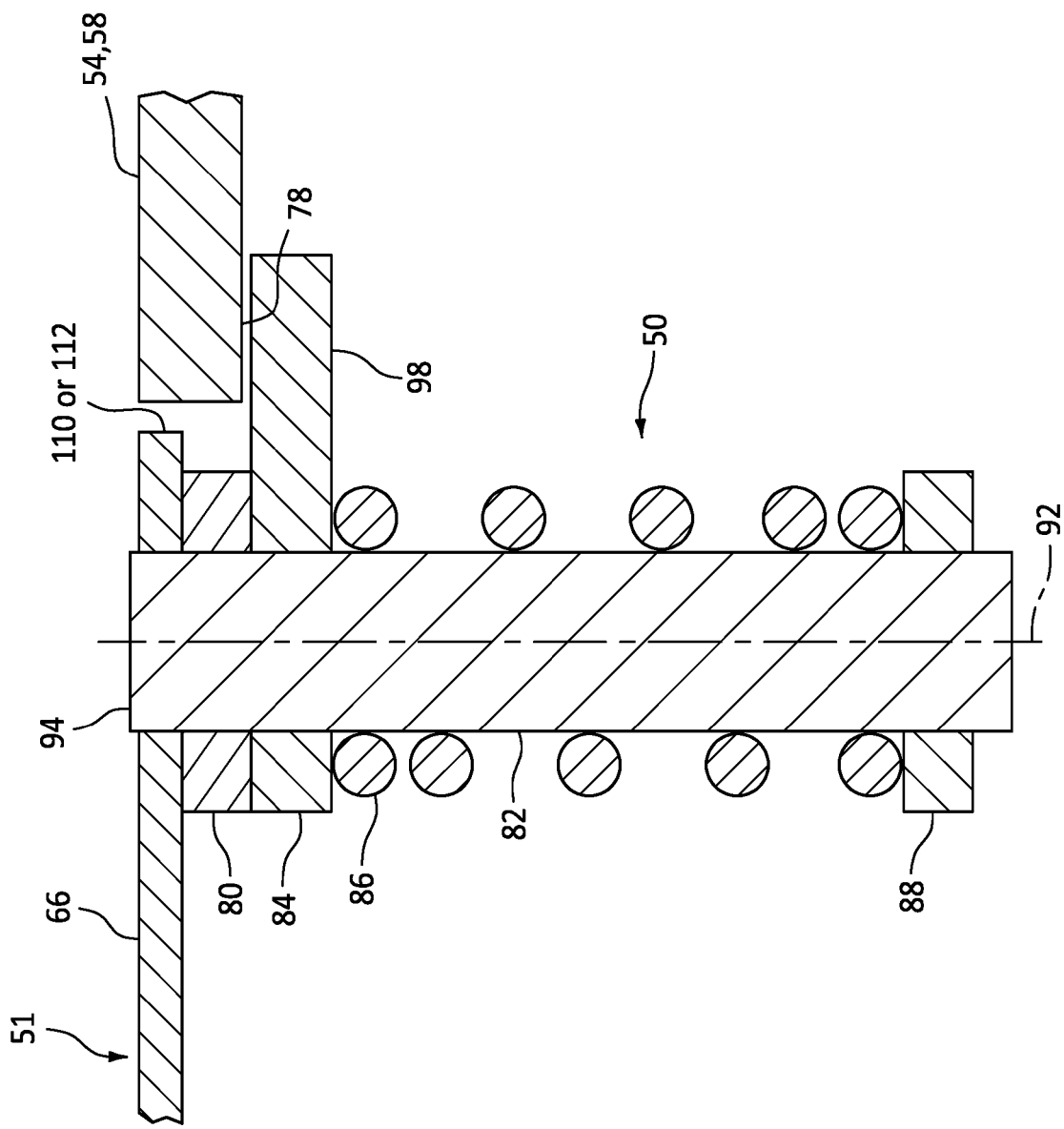

AIRCRAFT LATCH ASSEMBLY WITH LOCK

This application claims priority to Indian Patent Appln. No. 202211064346 filed Nov. 10, 2022, which is hereby incorporated herein by reference in its entirety.

BACKGROUND

1. Technical Field

This disclosure relates generally to a latch assembly for a structure such as, for example, an aircraft cowl.

2. Background Information

A modern aircraft propulsion system typically includes a gas turbine engine and a nacelle housing and providing an aerodynamic covering for the gas turbine engine. The nacelle may include one or more cowls for covering components of the gas turbine engine. These cowls may be pivotally mounted to a stationary structure enabling those cowls to be opened for providing access to the components underneath. The cowls may be secured in a closed position using one or more latch assemblies. Various types and configurations of latch assemblies are known in the art. While these known latch assemblies have various benefits, there is still room in the art for improvement.

SUMMARY OF THE DISCLOSURE

According to an aspect of the present disclosure, an assembly is provided for an aircraft. This aircraft assembly includes a keeper, a latch and a lock. The latch includes a handle and a hook structure operatively coupled to the handle. The handle is configured to move between a closed position and an open position. The hook structure is engaged with the keeper when the handle is in the closed position. The hook structure is disengaged from the keeper when the handle is in the open position. The lock includes a catch, a lever and a spring. The lever is configured to rotate about an axis between a locked position and an unlocked position. The lever is aligned with the catch locking the handle in the closed position when the lever is in the locked position. The lever is misaligned from the catch unlocking the handle from the closed position when the lever is in the unlocked position. The spring biases the lever axially along the axis in a direction towards the handle.

According to another aspect of the present disclosure, another assembly is provided for an aircraft. This aircraft assembly includes a keeper, a latch and a lock. The latch includes a handle and a hook structure operatively coupled to the handle. The handle is configured to move between a closed position and an open position. The hook structure is engaged with the keeper when the handle is in the closed position. The hook structure is disengaged from the keeper when the handle is in the open position. The lock includes a catch, a lever and a spring. The lever is mounted to the handle and is configured to rotate about an axis between a locked position and an unlocked position. The lever is aligned with the catch locking the handle in the closed position when the lever is in the locked position. The lever is misaligned from the catch unlocking the handle from the closed position when the lever is in the unlocked position. The spring biases the lever axially along the axis in a direction towards the handle.

According to another aspect of the present disclosure, another assembly is provided for an aircraft. This aircraft assembly includes a latch, a handle release device and a lock. The latch includes a handle and a hook structure operatively coupled to the handle. The handle is configured to move between a closed position and an open position. The handle release device is mounted to the handle. The handle release device includes a push button. The handle release device is configured to lock the handle in the closed position when the push button is in an undepressed position. The handle release device is configured to unlock the handle from the closed position when the push button is in a depressed position. The lock includes a lever and a spring. The lever is mounted to the handle. The lever is configured to rotate about an axis between a locked position and an unlocked position. The lever is aligned with the push button locking the push button in the undepressed position when the lever is in the locked position. The lever is misaligned from the push button unlocking the push button from the undepressed position when the lever is in the unlocked position. The spring biases the lever axially along the axis in a direction towards the handle.

According to still another aspect of the present disclosure, another assembly is provided for an aircraft. This aircraft assembly includes a latch and a lock. The latch includes a handle and a hook structure operatively coupled to the handle. The handle is configured to move between a closed position and an open position. The lock includes a catch, a mount, a bolt, a lever, a spring and a retainer. The mount rotatably attaches the bolt to the handle. The bolt projects axially along an axis out of an aperture in the handle and sequentially through the mount, the lever, the spring and the retainer. The lever is rotationally fixed to the bolt. The lever is configured to rotate about the axis between a locked position and an unlocked position. The lever is aligned with the catch locking the handle in the closed position when the lever is in the locked position. The lever is misaligned from the catch unlocking the handle from the closed position when the lever is in the unlocked position. The spring is axially compressed between the lever and the retainer.

The lever may be mounted to the handle.

The lever may be mounted to a structure adjacent the handle. The handle may move relative to the structure when moving between the open position and the closed position.

The handle release device may lock the handle to the hook structure when the push button is in the undepressed position.

The spring may be configured as or otherwise include a coil spring.

The spring may be axially adjacent and contact the lever.

The lock may include a bolt rotatably mounted to the handle. The lever may be rotationally fixed to the bolt. The spring may be mounted on and circumscribe the bolt.

The lever may be configured to axially translate along the bolt.

The bolt may project axially away from the handle and sequentially through the lever and the coil spring to an interior distal end of the bolt.

The lock may include a retainer mounted to the bolt at the interior distal end. The spring may be arranged axially between lever and the retainer.

The lock may include a mount and a retainer. The mount may rotatably mount the bolt to the handle. The retainer may be mounted to the bolt. The spring may be arranged axially between lever and the retainer. The spring may press the lever axially against the mount.

The bolt may project axially into an aperture in the handle and to an exterior distal end of the bolt. The bolt may have a wrenching feature at the exterior distal end.

The assembly may also include a handle release device comprising a push button. The handle release device may be configured to lock the handle in the closed position when the push button is in a first position. The handle release device may be configured to unlock the handle from the closed position when the push button is in a second position. The push button may form the catch.

The push button may be nested in an aperture in the handle.

The handle release device may be pivotally mounted to the handle.

The handle may extend longitudinally between a first end and a second end. The lock may be arranged at an intermediate location between the first end and the second end.

The handle may extend longitudinally between a first end and a second end. The lock may be arranged at the first end.

The lever may overlap a side of the catch when the lever is in the locked position.

The lever may project into a slot in the catch when the lever is in the locked position.

The assembly may also include a fixed structure, a first aircraft component and a second aircraft component. The first aircraft component may be pivotally attached to the fixed structure. The latch may be mounted to the first aircraft component. The second aircraft component may be pivotally attached to the fixed structure. The keeper may be mounted to the second aircraft component.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 14 is a partial illustration of the aircraft assembly with the latch assembly lock arranged at an alternative location along a handle.

DETAILED DESCRIPTION

Figure 1:
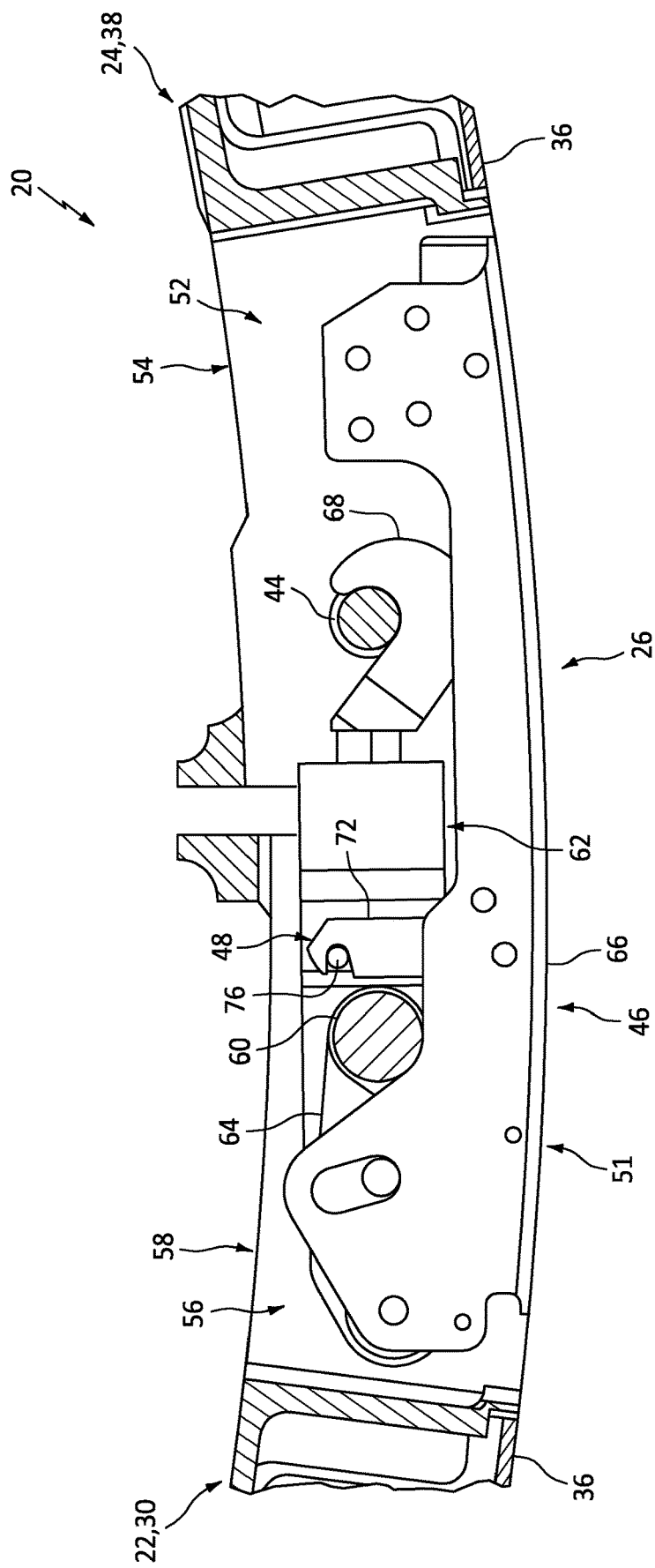
FIG. 1 is a partial side sectional illustration of an aircraft assembly.

FIG. 1 illustrates an assembly 20 for an aircraft structure. An example of the aircraft structure is a nacelle for an aircraft propulsion system, where the nacelle houses an aircraft propulsion system powerplant such as, but not limited to, a gas turbine engine. Another example of the aircraft structure is an aircraft fuselage. The assembly 20 of the present disclosure, however, is not limited to the foregoing exemplary aircraft structures. The assembly 20 of FIG. 1 includes one or more aircraft components 22 and 24 and a latch assembly 26.

Figure 2:
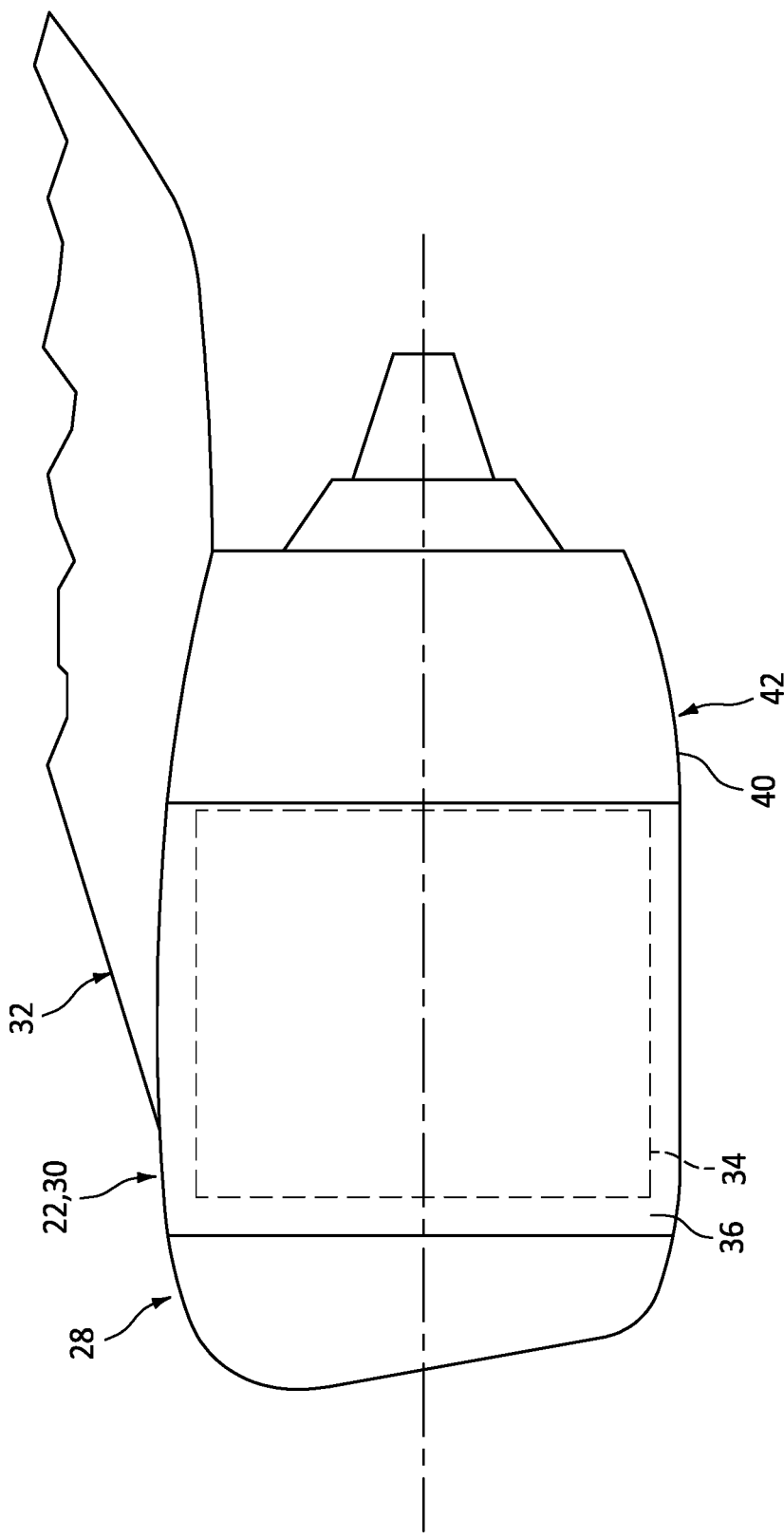
FIG. 2 is a side illustration of an aircraft propulsion system.
Figure 4:
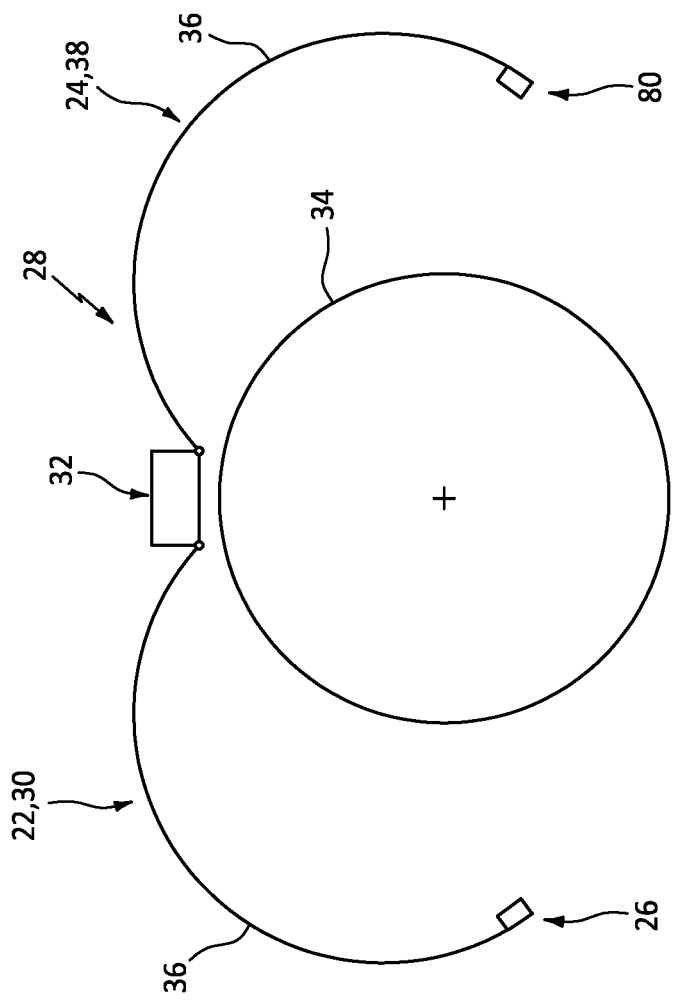
FIG. 4 is a schematic cross-sectional illustration of the aircraft propulsion system with its cowls in open positions.
Figure 3:
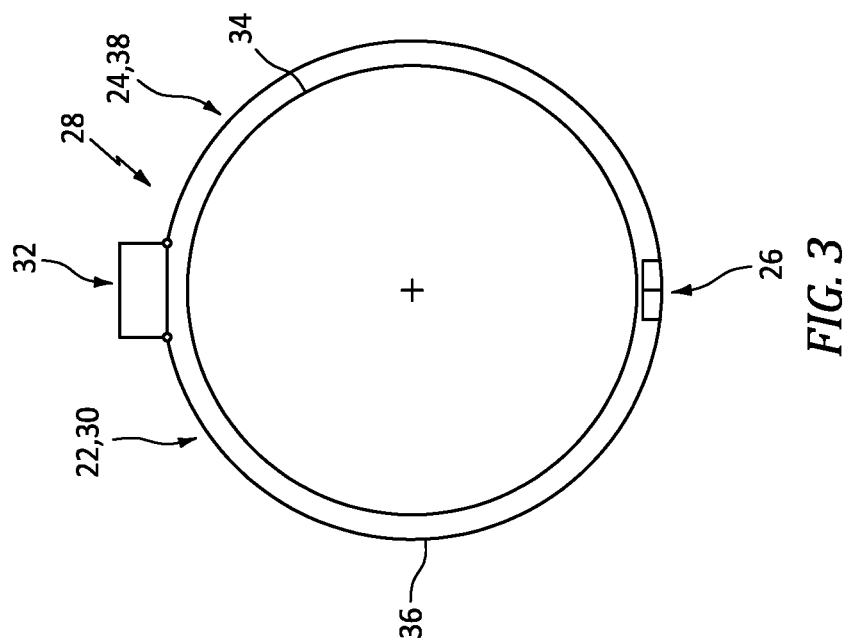
FIG. 3 is a schematic cross-sectional illustration of the aircraft propulsion system with its cowls in closed positions.

Referring to FIGS. 2-4, the first component 22 may be configured as part of an outer nacelle structure 28 for the aircraft propulsion system nacelle. The first component 22 of FIGS. 2-4, for example, may be configured as or otherwise include a first fan cowl 30 of the outer nacelle structure 28. This first fan cowl 30 is movably (e.g., pivotally) connected to a stationary structure 32 of the aircraft; e.g., a pylon structure for the aircraft propulsion system. The first fan cowl 30 is configured to move (e.g., pivot) between a fully closed position (e.g., see FIGS. 2 and 3) and a fully open position (e.g., see FIG. 4). In the closed position of FIG. 3, the first fan cowl 30 is configured to house and provide a first side aerodynamic covering for a fan case 34 for the powerplant. The first fan cowl 30 also partially forms an exterior aerodynamic surface 36 of the aircraft propulsion system nacelle.

The second component 24 may be configured as part of the outer nacelle structure 28. The second component 24 of FIGS. 3 and 4, for example, may be configured as or otherwise include a second fan cowl 38 of the outer nacelle structure 28, which second fan cowl 38 is arranged opposite the first fan cowl 30. This second fan cowl 38 is movably (e.g., pivotally) connected to the stationary structure 32. The second fan cowl 38 is configured to move (e.g., pivot) between a fully closed position (e.g., see FIG. 3) and a fully open position (e.g., see FIG. 4). In the closed position of FIG. 3, the second fan cowl 38 is configured to house and provide a second side aerodynamic covering for the fan case 34. The second fan cowl 38 also further forms the exterior aerodynamic surface 36 of the aircraft propulsion system nacelle.

The aircraft components 22 and 24 may be described herein as the fan cowls 30 and 38 for ease of description. It should be recognized, however, the latch assembly 26 may be configured with other components of the aircraft propulsion system or the aircraft fuselage. For example, referring to FIG. 2, each aircraft component 22, 24 may alternatively be configured as a respective section 40 (e.g., half; one visible in FIG. 2) of a thrust reverser 42, where the thrust reverser section 40 may be movably (e.g., pivotally) attached to the stationary structure 32 or another structure in a similar manner as described above with respect to the respective fan cowl 30, 38. The present disclosure therefore is not limited to any particular aircraft component configurations. Furthermore, while both aircraft components 22 and 24 are described as movable (e.g., pivotable) structures, it is contemplated one of the aircraft components 22, 24 may alternatively be configured as a fixed structure of the aircraft.

Referring again to FIG. 1, the latch assembly 26 is arranged at an interface between the first component 22 and the second component 24. The latch assembly 26 is configured to lock the (e.g., closed) aircraft components 22 and 24 together when the latch assembly 26 is closed/locked. The latch assembly 26 may thereby secure the first component 22 to the second component 24 when the latch assembly 26 is closed/locked. The latch assembly 26 is also configured to unlock the (e.g., closed) aircraft components 22 and 24 when the latch assembly 26 is open/unlocked. The latch assembly 26 may thereby enable movement of the first component 22 relative to the second component 24 (e.g., pivoting open each aircraft component 22, 24) when the latch assembly 26 is open/unlocked; e.g., see FIG. 5. The latch assembly 26 of FIG. 1 includes a keeper 44, a latch 46, a handle release device 48 and a lock 50 (see FIGS. 6 and 7). Briefly, the handle release device 48 may operate as a primary lock for a handle 51 of the latch 46. The lock 50 of FIGS. 6 and 7 may operate as a secondary lock for the handle 51 and/or a lock for the handle release device 48.

The keeper 44 of FIG. 1 is (e.g., fixedly) mounted to the second component 24. The keeper 44, for example, may be disposed within and extend across a channel 52 in a fitting 54 of the second component 24. Each end of the keeper 44 may be connected to a respective side (e.g., flange, wall, etc.) of the second component fitting 54. The keeper 44 may be configured as a pin, a rod, a fastener or any other elongated body that may mate with the latch 46 as described below.

The latch 46 is (e.g., movably) mounted to the first component 22. The latch 46, for example, may be disposed within a channel 56 in a fitting 58 of the first component 22. A latch pin 60 may extend through at least one component of the latch 46 and across the channel 56 in the first component fitting 58. Each end of the latch pin 60 may be connected to a respective side (e.g., flange, wall, etc.) of the first component fitting 58. The latch pin 60 may form a pivot axis about which the latch 46 may pivot and move between its closed/locked arrangement (e.g., see FIG. 1) and its open/unlocked arrangement (e.g., see FIG. 5).

The latch 46 of FIG. 1 includes the handle 51 and a hook structure 62. The latch 46 may also include an intermediate linkage 64 operatively coupling the handle 51 to the hook structure 62. Of course, in other embodiments, it is contemplated the handle 51 may be directly operatively coupled to the hook structure 62 or alternatively multiple intermediate linkages may operatively couple the handle 51 to the hook structure 62.

Figure 5:
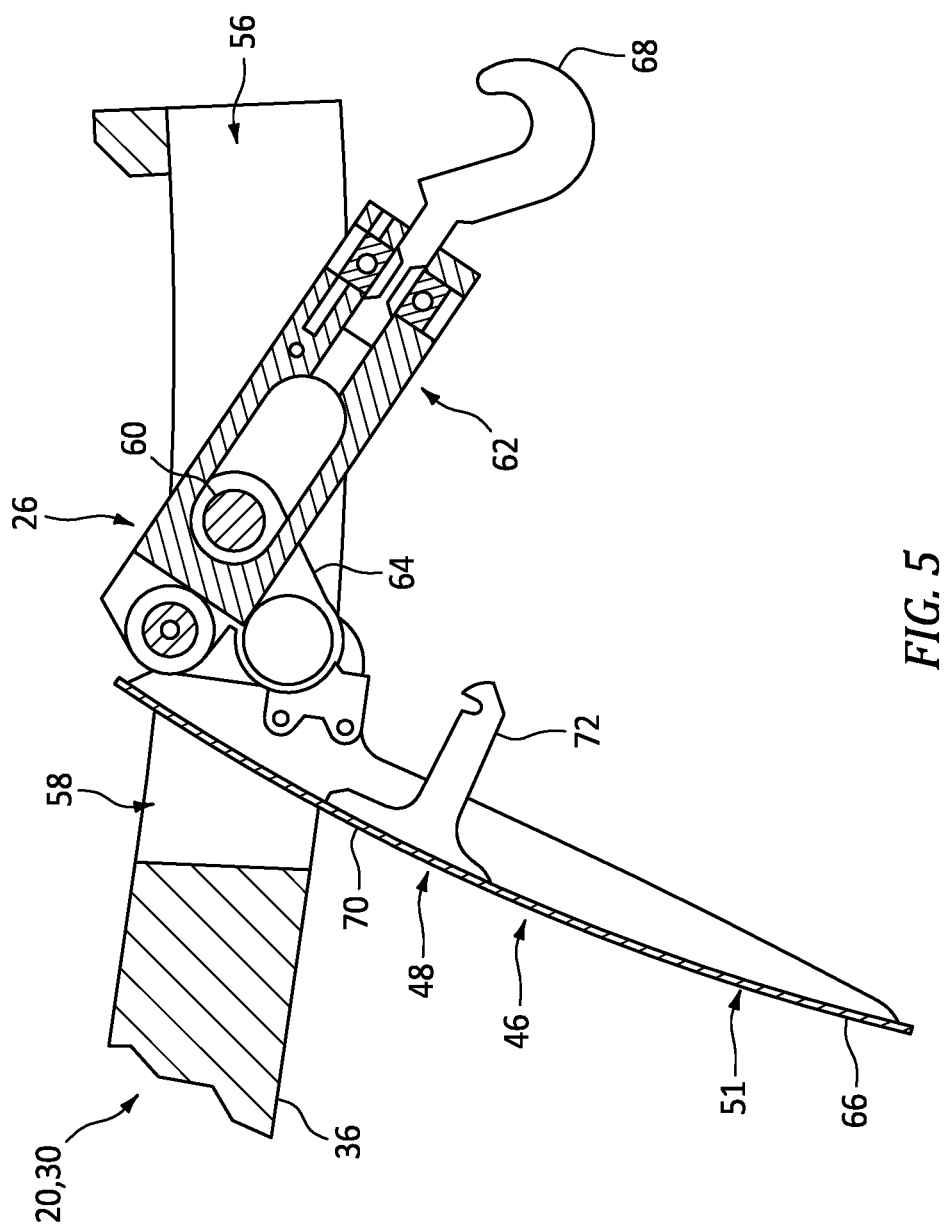
FIG. 5 is a partial sectional illustration of the aircraft assembly with its latch in an open position.

The handle 51 is configured to move between a fully closed position (e.g., see FIG. 1) and a fully open position (e.g., see FIG. 5). In the closed position of FIG. 1, the latch 46 and its members 51, 62 and 64 may be disposed within the fitting channels 52 and 56 and a base 66 of the handle 51 may be flush with the exterior aerodynamic surface 36. The hook structure 62 may also engage the keeper 44. More particularly, a hook 68 at a distal end of the hook structure 62 may latch onto (e.g., grasp, partially wrap around and contact, etc.) the keeper 44. With this closed/locked latch assembly arrangement, the latch 46 may be locked onto the keeper 44 and the latch assembly 26 may maintain/secure the aircraft components 22 and 24 in their closed positions. By contrast, in the open position of FIG. 5, the latch 46 and its members 51, 62 and 64 may project out from the first fitting channel 56 and the handle base 66 may be angularly offset from the exterior aerodynamic surface 36. The hook structure 62 may also be disengaged from the keeper 44 (see FIG. 1). More particularly, the hook 68 may no longer latch onto and/or contact the keeper 44 (see FIG. 1). With this open/unlocked latch assembly arrangement, the latch 46 may be unlocked from the keeper 44 allowing the aircraft components 22 and 24 to move relative to one another; e.g., allowing pivoting open of one or more of the aircraft components 22 and 24.

Figure 6:
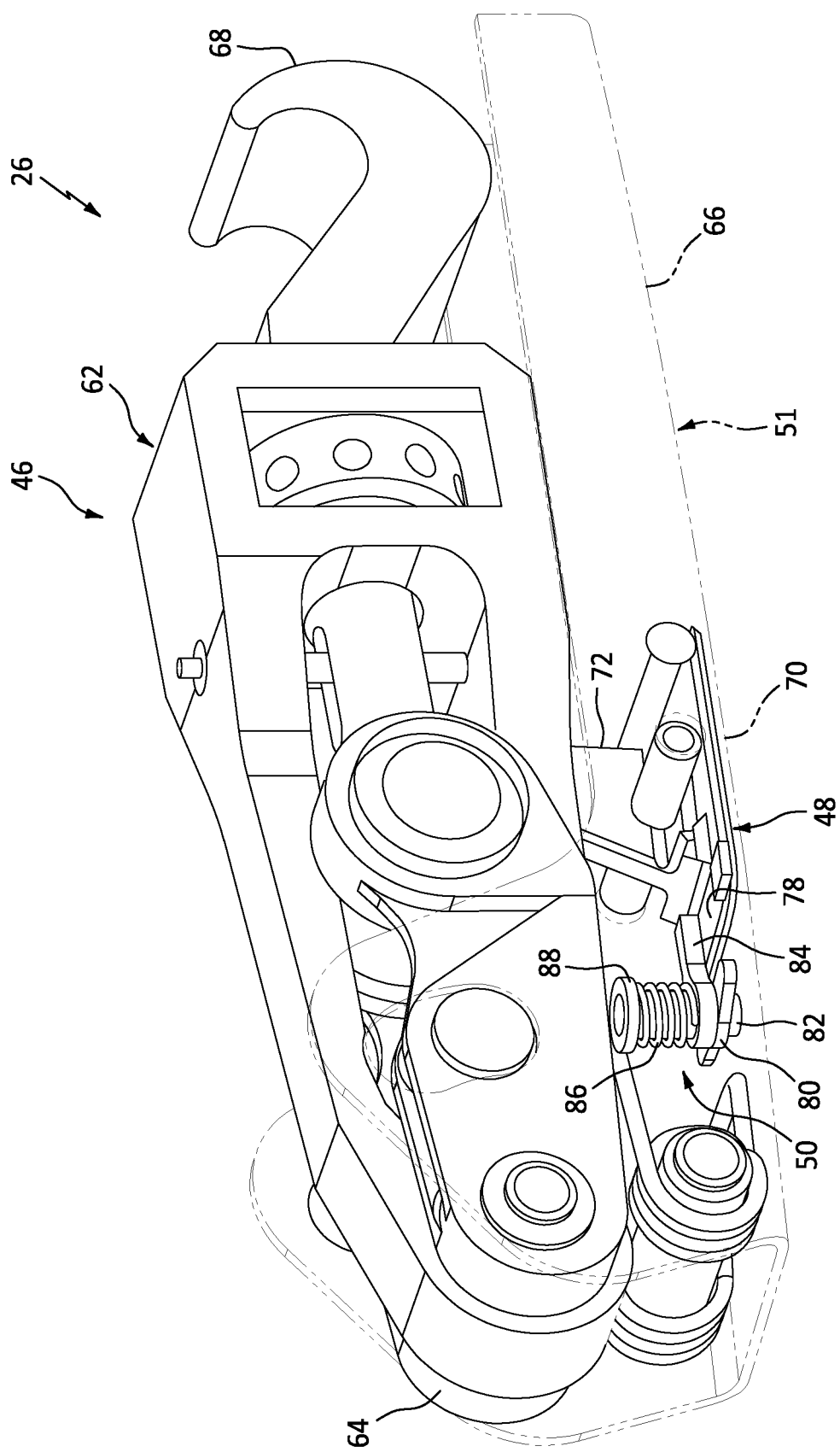
FIGS. 6 and 7 are perspective illustrations of a latch assembly shown without its keeper.
Figure 7:
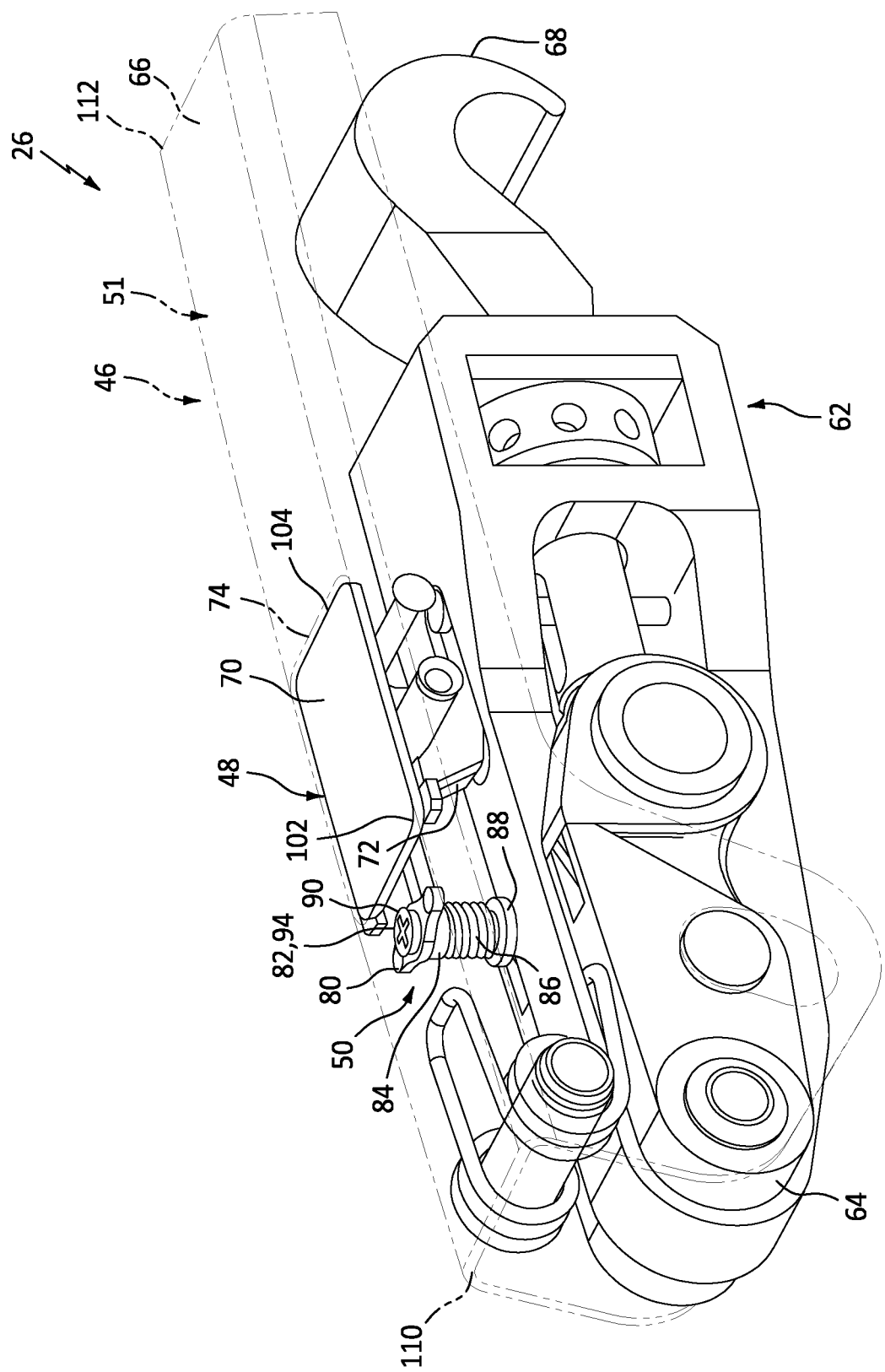
Figure 8B:
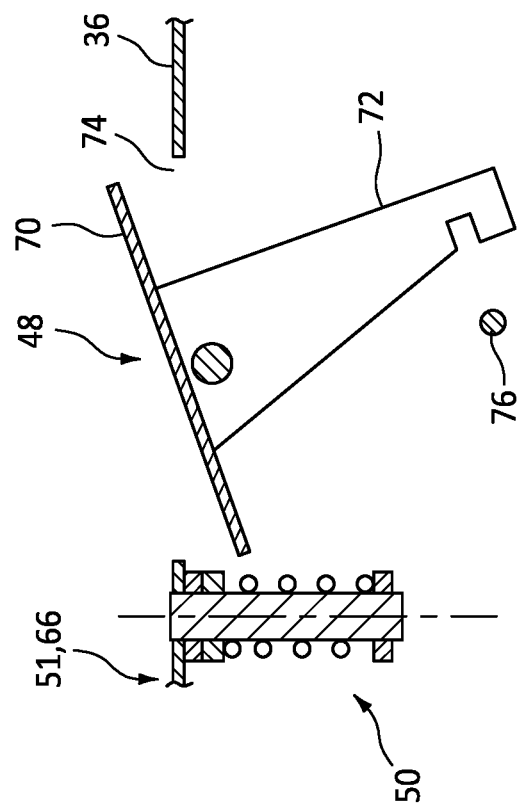
FIGS. 8A and 8B are schematic sectional illustrations of a portion of the latch assembly with a handle release device in various positions.
Figure 8A:
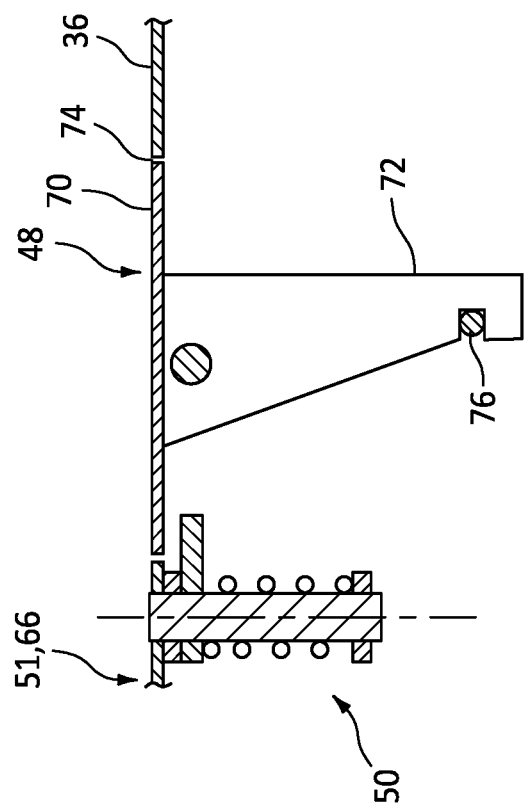

Referring to FIGS. 6 and 7, the handle release device 48 is movably (e.g., pivotally) connected to the latch 46. The handle release device 48, for example, includes a push button 70 (e.g., a planar panel) and a device latch 72. The device latch 72 is connected to and projects out from the push button 70. This device latch 72 may be pivotally connected to sidewalls of the handle 51 by a pin connection. With this arrangement, the handle release device 48 may move (e.g., pivot) between a first (e.g., locked) position (e.g., see FIG. 8A) and a second (e.g., unlocked) position (e.g., see FIG. 8B). In the first position of FIG. 8A, the push button 70 may be seated in an aperture 74 (e.g., a port) through the handle base 66. The push button 70 may be flush with the exterior aerodynamic surface 36 and/or the handle base 66. The push button 70 may thereby be in an undepressed position. Here, the device latch 72 may engage (e.g., latch onto) a device keeper 76 on the latch 46; e.g., on the hook structure 62 of FIG. 1. With the handle release device 48 in its first position, the handle release device 48 may lock (e.g., secure) the handle 51 in its closed position. By contrast, in the second position of FIG. 8B, the push button 70 may project into the handle 51 and the push button 70 may be angularly offset from the handle base 66 and/or the exterior aerodynamic surface 36. The push button 70 may thereby be in a depressed position. Here, the device latch 72 may disengage (e.g., release) the device keeper 76. With the handle release device 48 in its second position, the handle release device 48 unlocks the handle 51 from its closed position. In some embodiments, depressing the push button 70 may also allow another device (e.g., a spring, etc.) to at least partially push the handle 51 out from its closed position.

During certain events (e.g., a fan blade out event, fan windmilling, extreme turbulence, etc.), the handle release device 48 may be subject to relatively large vibrations. In an unlikely event that these vibrations become large and/or periodic enough, it may be possible for the handle release device 48 to inadvertently move (e.g., rattle) into its second position. To prevent such a movement, the latch assembly 26 is provided with the lock 50. This lock 50 may be configured to secure the handle release device 48 in its first position.

Figure 9:
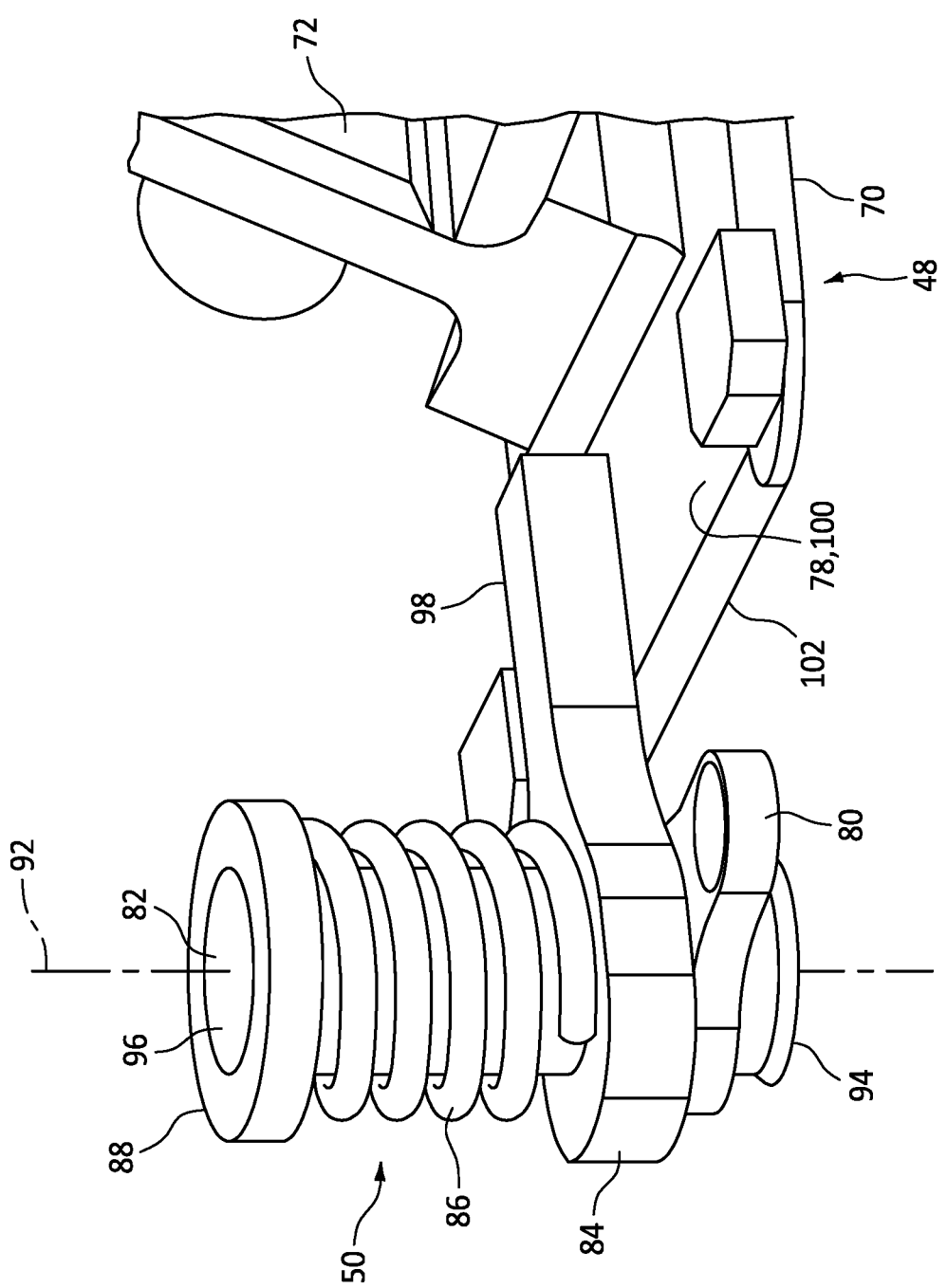
FIG. 9 is a partial perspective illustration of the latch assembly with a lever engaged with a catch.
Figure 10:
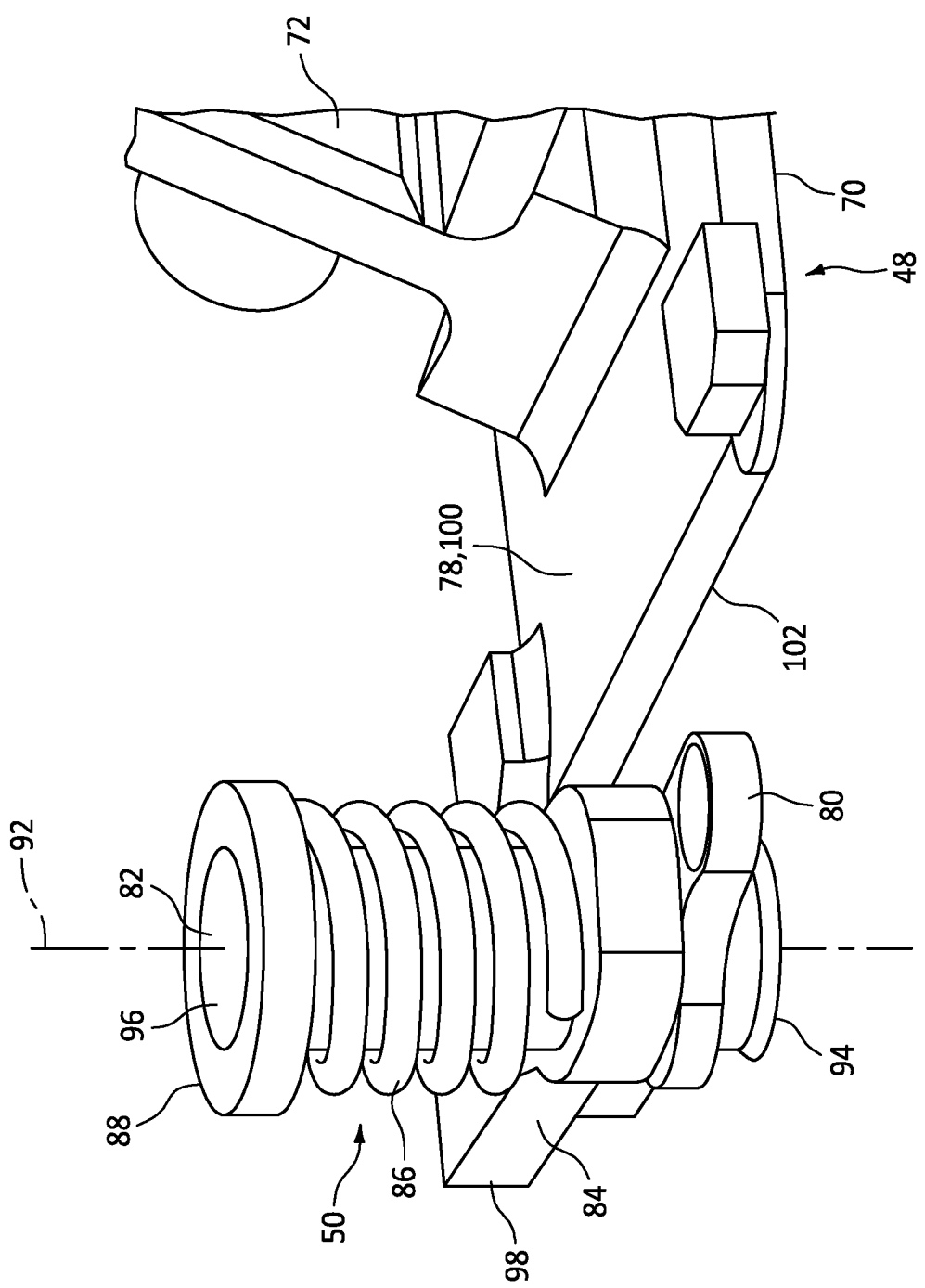
FIG. 10 is a partial perspective illustration of the latch assembly with the lever disengaged from the catch.

Referring to FIGS. 9 and 10, the lock 50 may include a catch 78, a mount 80 (e.g., a bracket), a bolt 82, a lever 84, a spring 86 (e.g., a coil spring, a compression spring, etc.) and a retainer 88. The catch 78 may be configured as a portion of the push button 70; e.g., a longitudinal end portion of the push button 70. Referring to FIG. 7, the mount 80 rotatably attaches the bolt 82 to the handle base 66. The bolt 82 (e.g., a pin, a rod, a fastener, etc.) is mated with an aperture 90 in the handle base 66; see also FIG. 13. The bolt 82 of FIG. 7, for example, projects axially along an axis 92 (see FIGS. 9 and 10) of the bolt 82 (in a first direction) into the aperture 90 to an exterior distal end 94 of the bolt 82. Referring to FIGS. 9 and 10, the bolt 82 projects axially along the axis 92 (in a second direction opposite the first direction) out from the handle base 66 (see FIG. 7), sequentially through apertures in the lock members 80, 84, 86 and 88, to an interior distal end 96 of the bolt 82. The lever 84 is rotationally fixed to the bolt 82 (e.g., via a keyed interface), but may translate axially along the bolt 82. The retainer 88 is mounted (e.g., fixed to) the bolt 82 at its interior distal end 96.

With the foregoing arrangement, each of the lock members 80, 84, 86 and 88 is mounted onto (and circumscribes)

the bolt 82. The lever 84 is axially between and may engage (e.g., contact, abut against, etc.) the mount 80 and the spring 86. The spring 86 is axially between and may engage the lever 84 and the retainer 88. The spring 86 may be compressed between the lever 84 and the retainer 88. The spring 86 may thereby bias (e.g., press) the lever 84 axially in the first direction against the mount 80 and towards the handle base 66 (see FIG. 7). The spring bias force may be selected to prevent unintentional rotation of the bolt 82 and, thus, the lever 84 about the axis 92. In other words, the spring bias force may be selected such that the large vibrations discussed above cannot ready disengage the lock 50.

The lock members 82 and 84 may be rotatable about the axis 92 between a locked position (e.g., see FIG. 9) and an unlocked position (e.g., see FIG. 10). In the locked position of FIG. 9 (see also FIG. 8A), the lever 84 is aligned with the catch 78/the push button 70. More particularly, an arm 98 of the lever 84 projects over and overlaps the catch 78/a backside surface 100 of the push button 70. The lever 84 and its arm 98 may thereby form a stop which prevents movement (e.g., depression) of the push button 70 out of its first position. The lock 50 therefore locks the handle release device 48 in its first position. Furthermore, by locking the push button 70 and, thus, the handle release device 48 in its first position, the lock 50 also locks the handle 51 (see FIG. 7) in its closed position. By contrast, in the unlocked position of FIG. 10 (see also FIG. 8B), the lever arm 98 is misaligned from the catch 78/the push button 70. More particularly, the lever arm 98 is positioned next to (e.g., does not overlap) the catch 78/the backside surface 100 of the push button 70. The lever 84 and its arm 98 may thereby no longer obstruct movement (e.g., depression) of the push button 70 out of its first position. The lock 50 therefore unlocks the handle release device 48 from its first position. Furthermore, by unlocking the push button 70 and, thus, the handle release device 48 from its first position, the lock 50 also enables opening of the handle 51 (see FIG. 7) (when the handle release device 48 is depressed).

Figure 12:
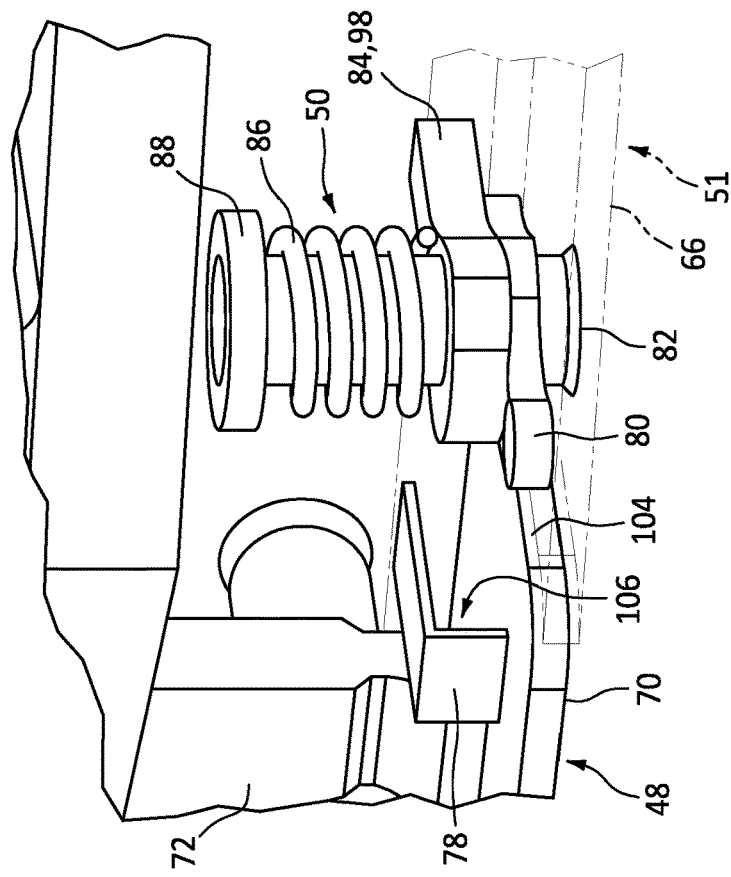
FIG. 12 is a partial perspective illustration of the latch assembly with the lever outside of the catch slot.
Figure 11:
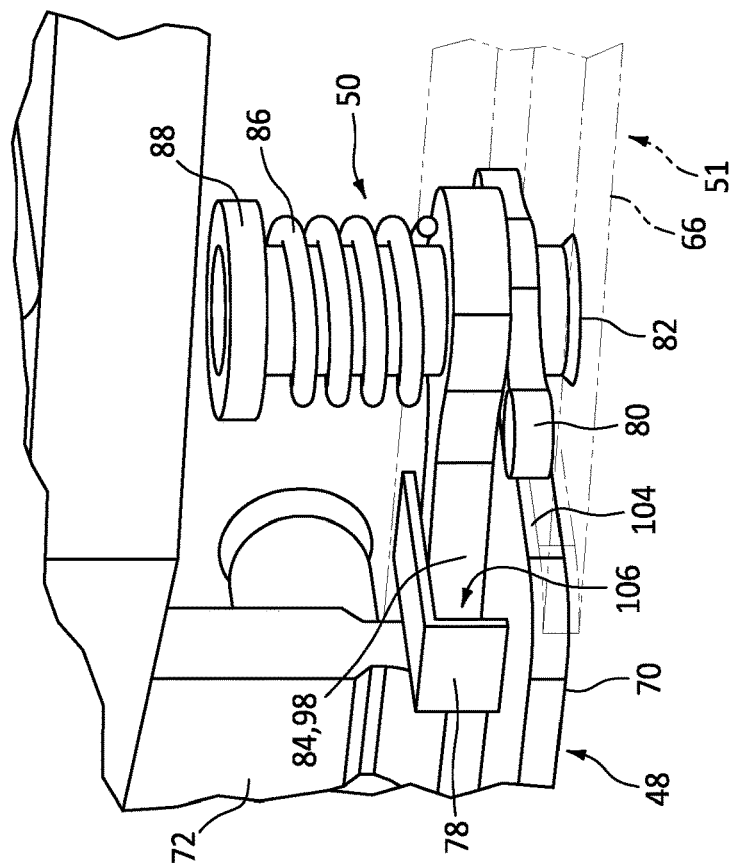
FIG. 11 is a partial perspective illustration of the latch assembly with the lever projecting into a catch slot.

In some embodiments, referring to FIGS. 9 and 10, the catch 78 is located towards an end 102 of the push button 70 that moves towards the lever 84 when the push button 70 is depressed. In other embodiments, referring to FIGS. 11 and 12, the catch 78 may alternatively be located towards an (e.g., opposite) end 104 of the push button 70 that moves away from the lever 84 when the push button 70 is depressed. In such embodiments, the catch 78 may include a slot 106. When the lever 84 is in the locked position of FIG. 11, the lever 84 may project into the slot 106 such that the lever 84 overlaps and may stop movement of an overhang of the catch 78. However, when the lever 84 is in the unlocked position of FIG. 12, the lever 84 may be disposed outside of the slot 106 permitting movement of the push button 70.

Figure 13:
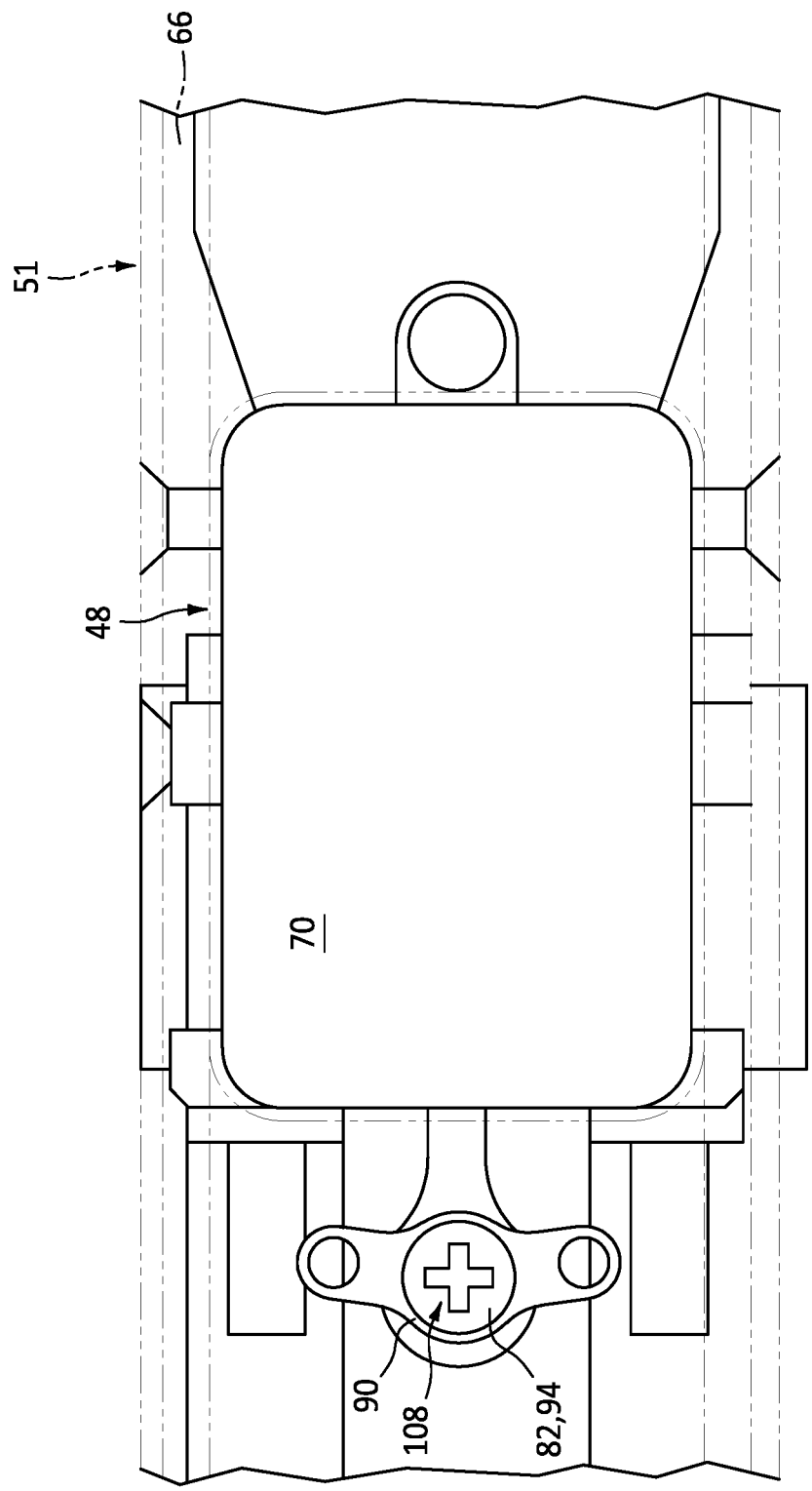
FIG. 13 is a partial illustration of the latch assembly at a lock.

In some embodiments, referring to FIG. 13, the bolt 82 may include a wrenching feature 108 to facilitate rotating the lever 84 about the axis 92 (see FIGS. 6 and 7) between its locked and unlocked positions. The bolt 82 of FIG. 13, for example, includes the wrenching feature 108 at the exterior distal end 94. Examples of the wrenching feature 108 include, but are not limited to, a Phillips head screwdriver socket, a regular head screwdriver socket and an Allen head socket.

In some embodiments, the lock 50 may be configured with one or more markings. One marking may indicate the lever 84 is in its locked position. Another marking may indicate the lever 84 is in its unlocked position.

In some embodiments, referring to FIG. 7, the lock 50 may be arranged at an intermediate location between opposing longitudinal ends 110 and 112 of the handle 51 and its handle base 66. More particularly, the lock 50 may be arranged at the push button 70. It is contemplated, however, the lock 50 may be arranged at other locations along the handle 51. For example, referring to FIG. 14, the lock 50 may be disposed at one of the longitudinal ends 110, 112 of the handle 51. In such embodiments, the catch 78 may be configured as a stationary structure located next to the respective handle end 110, 112; e.g., a portion of the fixture 54, 58.

Figure 16:
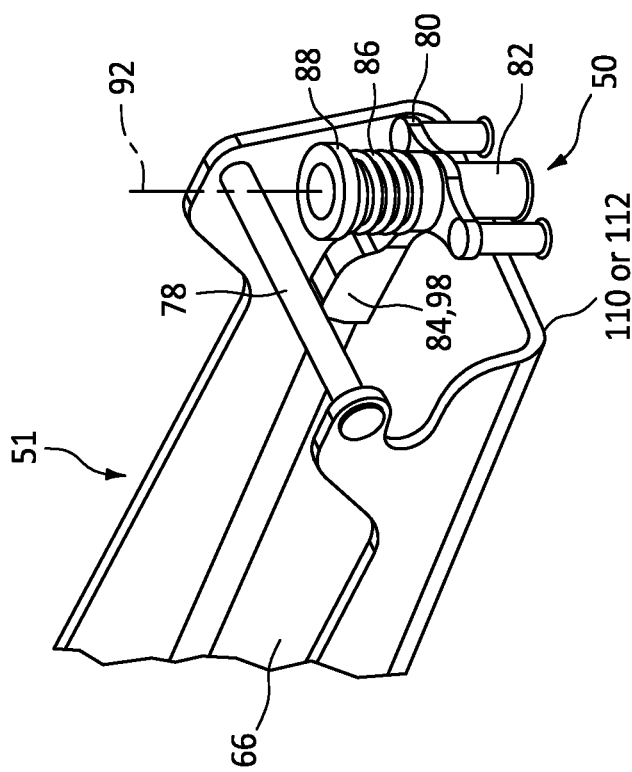
FIG. 16 is a partial perspective illustration of the latch assembly of FIG. 15.
Figure 15:
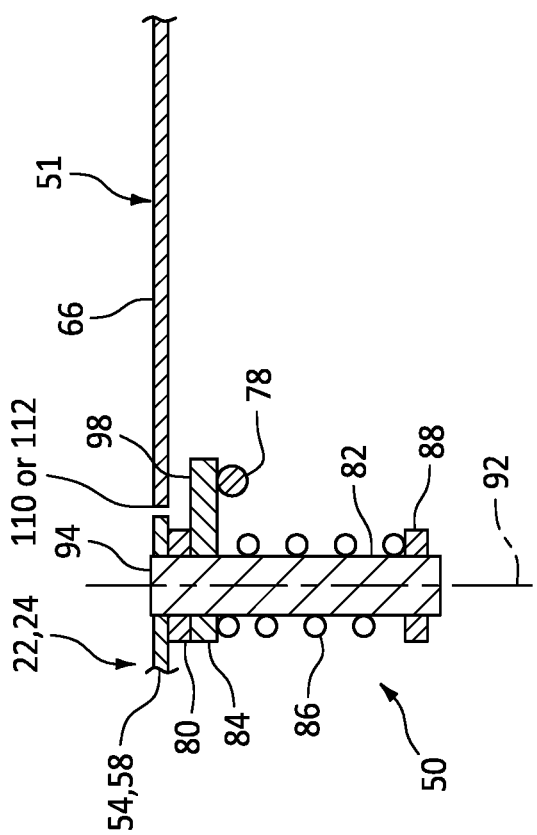
FIG. 15 is schematic sectional illustrations of a portion of the latch assembly with the lock arranged adjacent the handle.

In some embodiments, the lock 50 and its lever 84 may be arranged with and mounted to the handle 51 and its handle base 66. In other embodiments, referring to FIG. 15, the lock 50 and its lever 84 may alternatively be arranged with and mounted to a structure adjacent the handle 51, which structure may be one of the fittings 54, 58 or another portion of one of the aircraft components 22, 24 where the handle 51 is operable to move relative to the structure between its open and closed positions. In the arrangement of FIG. 15 (see also FIG. 16), the catch 78 is configured as a part of or a fixture connected to the handle 51.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft, comprising:
a keeper;
a latch including a handle and a hook structure operatively coupled to the handle, the handle configured to move between a closed position and an open position, the hook structure engaged with the keeper when the handle is in the closed position, and the hook structure disengaged from the keeper when the handle is in the open position;
a handle release device comprising a push button, the handle release device configured to lock the handle in the closed position when the push button is in a first position, the handle release device configured to unlock the handle from the closed position when the push button is in a second position, and the push button forming a catch; and
a lock including the catch, a lever and a spring, the lever configured to rotate about an axis between a locked position and an unlocked position, the lever aligned with the catch locking the handle in the closed position when the lever is in the locked position, the lever misaligned from the catch unlocking the handle from the closed position when the lever is in the unlocked position, and the spring biasing the lever axially along the axis in a direction towards the handle.

2. The assembly of claim 1, wherein the spring comprises a coil spring.

3. The assembly of claim 1, wherein the spring is axially adjacent and contacts the lever.

4. The assembly of claim 1, wherein
the lock further includes a bolt rotatably mounted to the handle;
the lever is rotationally fixed to the bolt; and
the spring is mounted on and circumscribes the bolt.

5. The assembly of claim 4, wherein the lever is configured to axially translate along the bolt.

6. The assembly of claim 4, wherein the bolt projects axially away from the handle and sequentially through the lever and the coil spring to an interior distal end of the bolt.

7. The assembly of claim 6, wherein
the lock further includes a retainer mounted to the bolt at the interior distal end; and
the spring is arranged axially between the lever and the retainer.

8. The assembly of claim 4, wherein
the lock further includes a mount and a retainer;
the mount rotatably mounts the bolt to the handle;
the retainer is mounted to the bolt; and
the spring is arranged axially between the lever and the retainer, and the spring presses the lever axially against the mount.

9. The assembly of claim 4, wherein
the bolt projects axially into an aperture in the handle and to an exterior distal end of the bolt; and
the bolt has a wrenching feature at the exterior distal end.

10. The assembly of claim 1, wherein the push button is nested in an aperture in the handle.

11. The assembly of claim 1, wherein the handle release device is pivotally mounted to the handle.

12. The assembly of claim 1, wherein
the handle extends longitudinally between a first end and a second end; and
the lock is arranged at an intermediate location between the first end and the second end.

13. The assembly of claim 1, wherein the lever overlaps a side of the catch when the lever is in the locked position.

14. The assembly of claim 1, wherein the lever projects into a slot in the catch when the lever is in the locked position.

15. The assembly of claim 1, further comprising:
a fixed structure;
a first aircraft component pivotally attached to the fixed structure, the latch mounted to the first aircraft component; and
a second aircraft component pivotally attached to the fixed structure, the keeper mounted to the second aircraft component.

16. An assembly for an aircraft, comprising:
a latch including a handle and a hook structure operatively coupled to the handle, the handle configured to move between a closed position and an open position;
a handle release device mounted to the handle and comprising a push button, the handle release device configured to lock the handle in the closed position when the push button is in an undepressed position, and the handle release device configured to unlock the handle from the closed position when the push button is in a depressed position; and
a lock including a lever and a spring, the lever mounted to the handle and configured to rotate about an axis between a locked position and an unlocked position, the lever aligned with the push button locking the push button in the undepressed position when the lever is in the locked position, the lever misaligned from the push button unlocking the push button from the undepressed position when the lever is in the unlocked position, and the spring biasing the lever axially along the axis in a direction towards the handle.

17. The assembly of claim 16, wherein the handle release device locks the handle to the hook structure when the push button is in the undepressed position.

18. An assembly for an aircraft, comprising:
a latch including a handle and a hook structure operatively coupled to the handle, the handle configured to move between a closed position and an open position;
a handle release device comprising a catch, the handle release device configured to lock the handle in the closed position when the catch is in a first position, the handle release device configured to unlock the handle from the closed position when the catch is in a second position; and
a lock including the catch, a mount, a bolt, a lever, a spring and a retainer, the mount rotatably attaching the bolt to the handle, the bolt projecting axially along an axis out of an aperture in the handle and sequentially through the mount, the lever, the spring and the retainer, the lever rotationally fixed to the bolt and configured to rotate about the axis between a locked position and an unlocked position, the lever aligned with the catch locking the handle in the closed position when the lever is in the locked position, the lever misaligned from the catch unlocking the handle from the closed position when the lever is in the unlocked position, and the spring axially compressed between the lever and the retainer.

19. The assembly of claim 18, wherein
a push button forms the catch; and
the push button is nested in an aperture in the handle.

* * * * *